(12) United States Patent
D'Ouince et al.

(10) Patent No.: US 7,415,396 B2
(45) Date of Patent: Aug. 19, 2008

(54) METHOD AND DEVICE FOR MONITORING THE VALIDITY OF AT LEAST ONE PARAMETER WHICH IS CALCULATED BY AN ANEMOMETERIC UNIT OF AN AIRCRAFT

(75) Inventors: Arnaud D'Ouince, Toulouse (FR); Rémi Andreoletti, Toulouse (FR)

(73) Assignee: AIRBUS France, Toulouse (FR)

( * ) Notice: Subject to any disclaimer, the term of this patent is extended or adjusted under 35 U.S.C. 154(b) by 410 days.

(21) Appl. No.: 10/883,783

(22) Filed: Jul. 6, 2004

(65) Prior Publication Data
US 2005/0010389 A1 Jan. 13, 2005

(30) Foreign Application Priority Data
Jul. 7, 2003 (FR) .................... 03 08269

(51) Int. Cl.
*G06F 17/10* (2006.01)
(52) U.S. Cl. .................... 703/2; 701/8; 700/52
(58) Field of Classification Search .................... 703/2, 703/6, 7; 701/3, 4, 7, 8, 9; 700/44, 45, 51, 700/52
See application file for complete search history.

(56) References Cited

U.S. PATENT DOCUMENTS

| | | | |
|---|---|---|---|
| 3,851,157 A * | 11/1974 | Ellis | 700/45 |
| 4,785,403 A | 11/1988 | Kuhlberg | |
| 5,648,604 A | 7/1997 | Morbieu | |
| 6,285,298 B1 | 9/2001 | Gordon | |
| 6,993,419 B2 * | 1/2006 | D'Ouince et al. | 701/3 |
| 2004/0111193 A1 * | 6/2004 | D'Ouince et al. | 701/9 |

FOREIGN PATENT DOCUMENTS

EP 0244344 11/1987

OTHER PUBLICATIONS

Preliminary Search Report dated Apr. 13, 2004 with English translation.

* cited by examiner

*Primary Examiner*—Russell Frejd
(74) *Attorney, Agent, or Firm*—Dickinson Wright, PLLC

(57) ABSTRACT

A method and device for monitoring the validity of a parameter calculated by an anemometric unit of an aircraft may employ a first section for taking into account n first data, each dependent on the parameter being monitored and n being greater than or equal to 1. A second section takes into account p second data that each depends on a value obtained from a data source external to the anemometric unit, where P is greater than or equal to 2. A calculator calculates, for each of the second data, a difference between this second datum and a first datum of the same type. A comparator compares the absolute value of each of the calculated differences with a threshold value. A deducing section deduces from the comparisons that the monitored parameter is invalid if the absolute values of two of the various differences are greater than the corresponding threshold values.

16 Claims, 2 Drawing Sheets

METHOD AND DEVICE FOR MONITORING THE VALIDITY OF AT LEAST ONE PARAMETER WHICH IS CALCULATED BY AN ANEMOMETERIC UNIT OF AN AIRCRAFT

FIELD OF THE INVENTION

The present invention relates to a method and a device for monitoring the validity of at least one parameter which is calculated by an anemometric unit of an aircraft.

BACKGROUND OF THE RELATED ART

The parameters which are suitable for being monitored in the scope of the present invention, and which are calculated by an anemometric unit, are in particular the total pressure Pt, the static pressure Ps and the total temperature TAT, which are important parameters for piloting the aircraft. In order to be valid, these parameters Ps, Pt, TAT must have at least a predetermined level of reliability.

It is known that most modern airplanes include at least one anemometric unit for determining the values of information such as the altitude of the aircraft or its velocity, which are used when piloting. For reasons of operational safety, airplanes generally include two or three anemometric units. In order to calculate the aforementioned parameters, each anemometric unit acquires data coming from one or more pressure sensors. Usually, each of said pressure sensors is located inside the fuselage of the airplane and is connected by a tube to a probe arranged passing through the surface of said fuselage. This tube is generally connected to the associated pressure sensor by means of a pneumatic connector, allowing it to be disconnected and reconnected easily.

It is known that human errors, in particular during maintenance operations of the airplane, may cause malfunction of one or more of the pressure sensors of such an anemometric unit.

For example, the personnel tasked with performing an operation of washing the airplane often stick a piece of adhesive tape on each of the probes of the anemometric unit, in order to prevent water from entering the tube during said wash. If they forget to remove one of said pieces of adhesive tape after the wash, the corresponding pressure sensor will be inoperative during the next flight of the airplane, since it will not be able to measure the pressure of the air outside the fuselage. It will in fact measure the pressure of the air in the tube, which is closed by the piece of adhesive tape at its end next to the probe.

Another example of malfunction relates to the case when maintenance personnel disconnect the tube and the pressure sensor at an appropriate connector, for example in order to clean the inside of this tube. If they forget to reconnect the tube to the pressure sensor after having carried out the maintenance operation, said pressure sensor will also be inoperative since it will measure the pressure of the air inside the fuselage, instead of measuring the pressure of the air outside the fuselage.

Another case of malfunction of a pressure sensor which may arise during the flight of the aircraft, relates to the case of said probes (for example the "Pitot" tube) icing up, which can prevent correct operation of said pressure sensor. No known solution makes it possible to detect the validity defect of an aforementioned parameter of the aircraft due to this last malfunction.

SUMMARY OF THE INVENTION

It is an object of the present invention to overcome these drawbacks. It relates to a method for monitoring the validity of at least one parameter which is calculated by an anemometric unit of an aircraft, and for detecting any anomaly of such a parameter rapidly and reliably, and at a low cost.

To that end, said method is noteworthy according to the invention in that:
a) a number n of first data are taken into account, each dependent on said parameter which is being monitored, n being an integer greater than or equal to 1;
b) a plurality of p second data are taken into account, p being an integer greater than or equal to 2, each of said p second data being of the same type as one of said n first data and dependent on at least one value obtained from at least one data source which is external to said anemometric unit, the various data sources furthermore being separate from one another;
c) for each of said p second data, a difference is calculated between this second datum and a first datum of the same type;
d) the absolute value of each of the differences calculated in this way is compared with a predetermined threshold value, in each case dependent on the data type corresponding to said difference; and
e) the following are deduced from said comparisons:
that said parameter is invalid if the absolute values of at least two of said various differences are greater than the corresponding predetermined threshold values; and
that said parameter is valid otherwise By virtue of the invention, it is thus possible to rapidly and reliably determine any anomaly (or invalidity) of a parameter calculated by an anemometric unit.

The present invention therefore makes it possible to monitor at least one parameter Pt, Ps and/or TAT of an anemometric unit of an aircraft, which requires a high level of reliability, from values which are obtained from data sources external to said anemometric unit and whose level of reliability may be lower than that of the parameter which is being monitored, owing to the use of at least two separate external data sources.

According to the invention:
said first data may be calculated from the parameter which is being monitored, or may quite simply correspond to this parameter; and
second data may be calculated from the value obtained from an external data source, or may quite simply correspond to this value.

When at least two parameters are being monitored simultaneously, at least one of said first data advantageously depends simultaneously on said two parameters.

In a preferred embodiment, said first data include at least one of the following data:
a barometric altitude, this being calculated from the static pressure which is being monitored; and
a velocity of the aircraft with respect to the air, this being calculated from the static and total pressures which are being monitored.

Furthermore, at least one of said second data, which depend on values obtained from data sources external to the anemometric unit, advantageously corresponds to at least one of the following values:
an altitude value provided by a satellite positioning system;
a total pressure value measured by a probe associated with at least one engine of the aircraft;
a static pressure value measured by a probe associated with at least one engine of the aircraft;

a total temperature value measured by a probe associated with at least one engine of the aircraft;

a velocity value provided by a velocity estimation means;

a static pressure value measured by a multifunctional probe;

a static pressure value measured by a standby instrument; and a total pressure value measured by a standby instrument.

The following differences are advantageously calculated in step c) in order to monitor the static pressured calculated by the anemometric unit:

the difference between a barometric altitude, calculated from said static pressure being monitored, and an altitude value provided by a satellite positioning system;

the difference between a barometric altitude, calculated from said static pressure being monitored, and an altitude calculated from a static pressure value measured by a standby instrument;

the difference between said static pressure being monitored and a static pressure value measured by a probe associated with an engine of the aircraft;

the difference between said static pressure being monitored and a static pressure value measured by a multifunctional probe; and the difference between a velocity of the aircraft with respect to the air, calculated from said static pressure being monitored, and a velocity value provided by a velocity estimation means.

Furthermore, the following differences are advantageously calculated in step c) in order to monitor the total pressured calculated by the anemometric unit:

the difference between said total pressure being monitored and a total pressure value measured by a probe associated with an engine of the aircraft;

the difference between a velocity of the aircraft with respect to the air, calculated from said total pressure being monitored, and a velocity value provided by a velocity estimation means; and the difference between a velocity of the aircraft with respect to the air, calculated from said total pressure being monitored, and a velocity calculated from a total pressure value measured by a standby instrument.

Furthermore, the following differences are advantageously calculated in step c) in order to monitor the total temperature calculated by the anemometric unit:

the difference between a barometric altitude, corrected with the aid of said total temperature being monitored, and an altitude value provided by a satellite positioning system;

the difference between said total temperature being monitored and a total temperature value measured by a probe associated with an engine of the aircraft; and the difference between a velocity of the aircraft with respect to the air, calculated from said total temperature being monitored, and a velocity value provided by a velocity estimation means.

In a particular embodiment applied to an aircraft provided with q engines, q being an integer greater than or equal to 3, the values measured by probes associated with said q engines are taken into account and the corresponding differences are calculated, and a difference is considered to be abnormal only if it is abnormal with respect to the measured values relating to at least three of said q engines.

This makes it possible to avoid prematurely considering a monitored parameter to be invalid (abnormal difference) in the event of a malfunction of one of the engines of the airplane, leading to a malfunction of the probe or probes associated with this engine.

In another embodiment applied to an aircraft provided with two engines, the values measured by probes associated with said two engines are taken into account and the corresponding differences are calculated, the differences with respect to the measured values relating to said two engines are considered in each case, and said differences are no longer taken into account in the event of a malfunction by one of said two engines.

Furthermore, the monitoring of the validity of said parameter is advantageously disabled when the aircraft is in at least one particular flight phase, such as take-off or landing, and when it is passing through turbulence zones. This allows this monitoring to be made more robust by preventing a monitored parameter from prematurely being considered to be invalid.

The present invention also relates to a device for monitoring the validity of at least one parameter which is calculated by an anemometric unit of an aircraft, in particular a transport aircraft.

According to the invention said device is noteworthy in that it includes:

means for taking into account at least a number n of first data, each dependent on said parameter which is being monitored, n being an integer greater than or equal to 1;

means for taking into account a plurality of p second data, p being an integer greater than or equal to 2, each of said p second data being of the same type as one of said n first data and dependent on at least one value obtained from at least one data source which is external to said anemometric unit, the various data sources furthermore being separate from one another;

means for calculating, for each of said p second data, a difference between this second datum and a first datum of the same type;

means for comparing the absolute value of each of the differences calculated in this way with a predetermined threshold value, dependent on the data type corresponding to said difference; and means for deducing from said comparisons:

that said parameter is invalid if the absolute values of at least two of said various differences are greater than the corresponding predetermined threshold values; and that said parameter is valid otherwise.

BRIEF DESCRIPTION OF THE DRAWINGS

The figures of the appended drawing will clearly show how the invention may be implemented. In these figures, identical references denote similar elements.

DETAILED DESCRIPTION OF THE INVENTION

Figure 1:
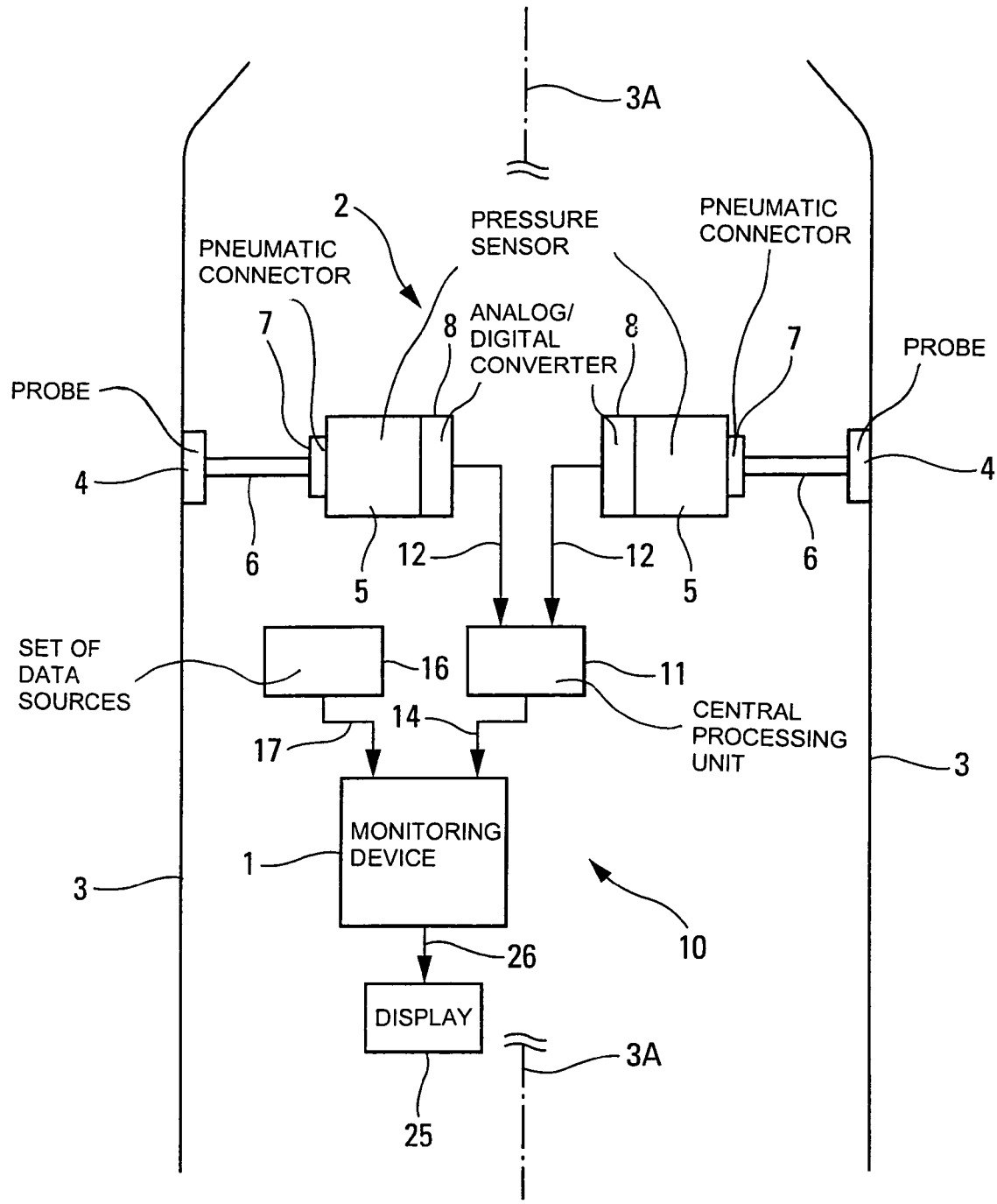
FIG. 1 schematically illustrates a system according to the invention, applied to an aircraft (partially represented).

The device 1 according to the invention, and schematically represented in FIG. 1, is intended for monitoring a standard anemometric unit 2 of an airplane, in particular a civil transport aircraft, of which only a part of the fuselage 3 with a longitudinal axis 3A has been represented in this FIG. 1 for the sake of simplifying the drawing.

It is known that such an anemometric unit 2 is intended to calculate parameters for determining the values of information such as the altitude, velocity, etc. of the airplane. To do this, as is known, said anemometric unit 2 Includes probes 4 which are fitted passing through the fuselage 3 of the airplane, and which access the outside;

pressure sensors 5, which are each connected by means of a tube 6 to a probe 4. Such a tube 6, which forms a pneumatic link, is generally connected to the associated pressure sensor 5 by means of a pneumatic connector 7, which allows it to be disconnected and reconnected easily and quickly. An analog/digital converter is furthermore associated with each pressure sensor 5; and a central processing unit 11 which is connected to the pressure sensors 5 by electrical links 12, for example in the form of a communication bus complying with the "ARINC 429" standard.

It is, however, also conceivable to integrate the pressure sensors 5 in the central processing unit 11.

A civil transport aircraft generally includes two or three anemometric units 2 of the type described above.

The purpose of the device 1 according to the invention, which forms part of a monitoring system 10 specified below (as does said anemometric unit 2), is to monitor the validity of at least one customary parameter, such as the static pressure Ps, the total pressure Pt or the total temperature TAT, which is calculated by the central processing unit 11 of said anemometric unit 2.

Figure 2:
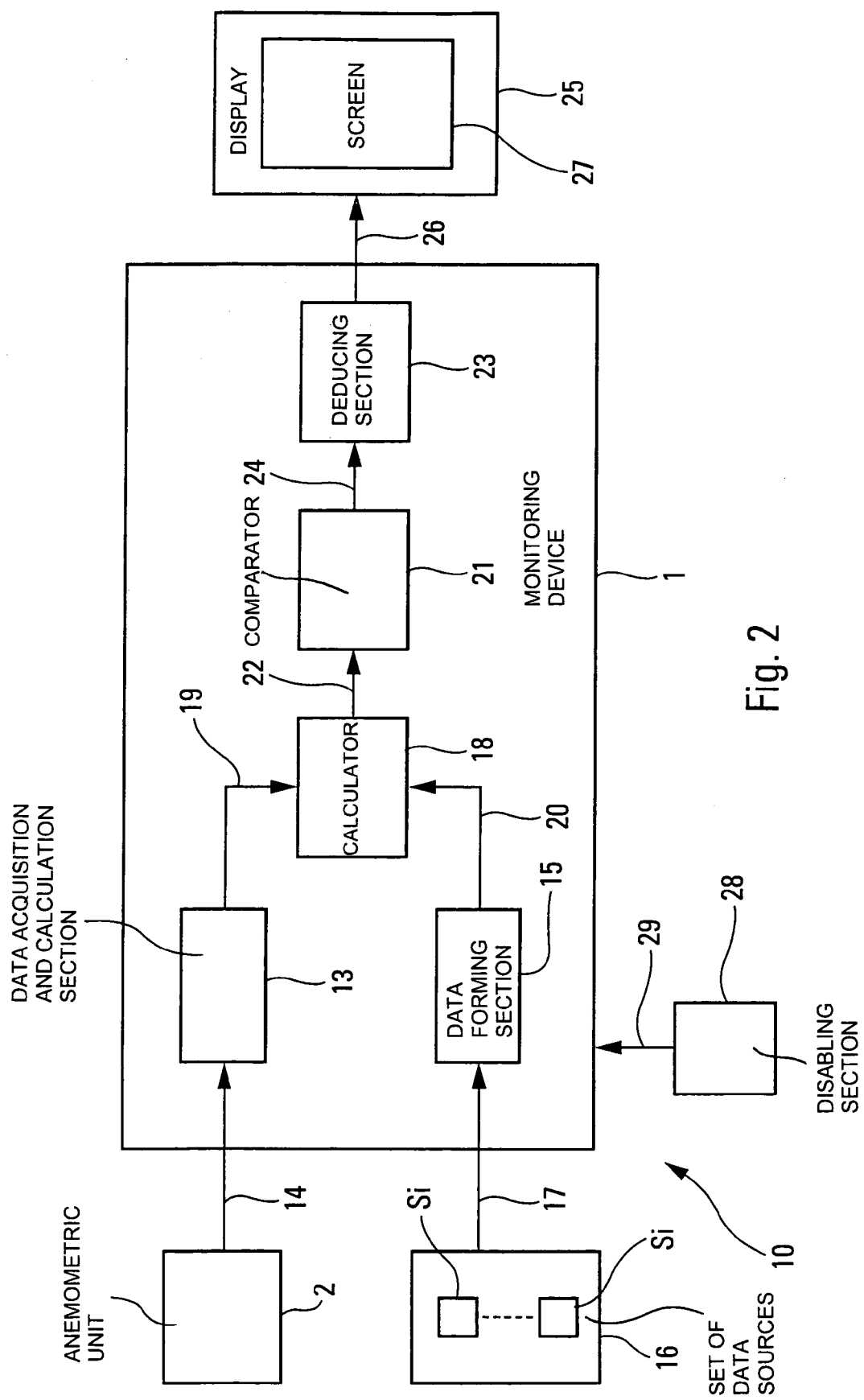
FIG. 2 is the block diagram of a system according to the invention.

To that end, said device 1 includes, as represented in FIG. 2:

means 13 which are connected by a link 14 to the anemometric unit 2 and which are intended to form at least a number n of first data, each dependent on said monitored parameter Ps, Pt, TAT and received from said anemometric unit 2, n being an integer greater than or equal to 1. Some of said first data may be calculated from the monitored parameter by the means 13 (which are then data acquisition and calculation means). Others of said first data may correspond to the actual parameter received by said means 13 (which are then simply data acquisition means);

means 15 for forming a plurality of p second data, p being an integer greater than or equal to 2. Each of said p second data is of the same type as one of said n first data and depends on at least one value obtained from at least one data source Si which is external to said anemometric unit 2. Said data sources Si, which are separate from one another, are combined as a set 16 of data sources which is connected by a link 17 to said means 15. Said second data may be calculated from the value obtained from an external data source Si, or may quite simply correspond to this value;

means 18 which are respectively connected by links 19 and 20 to said means 13 and 15 in order to calculate, for each of said p second data, a difference between this second datum and a first datum of the same type. In the scope of the present invention, two data are considered to be of the same type when their values relate to the same quantity (velocity, altitude, etc.) and are expressed in the same units, for example two velocities expressed in knots or in km/h, or two altitudes expressed in feet;

means 21 which are connected by a link 22 to said means 18, in order to compare the absolute value of each of the differences calculated by said means 18 with a predetermined threshold value, dependent on the type of said difference; and means 23 which are connected by a link 24 to said means 21, in order to deduce from said comparisons:

that said monitored parameter Ps, Pt, TAT is invalid if the absolute values of at least two of said various differences are greater than the corresponding predetermined threshold values (that is to say if at least two differences are abnormal); and that said parameter is valid otherwise (that is to say if no difference is abnormal, or if only one is).

The monitoring system 10 according to the invention includes:

said monitoring device 1;

said anemometric unit 2; and said set 16 of data sources Si.

Said monitoring system 10 furthermore includes a display means 25, which is connected by a link 26 to the means 23 and which can display a datum indicating an anomaly (or an invalidity) of a parameter (Ps, Pt, TAT) calculated by the anemometric unit 2, as appropriate, on at least one visualization device, in particular a customary visualization screen 27, fitted for example in the cockpit of the airplane.

The device 1 (or the system 10) according to the invention is therefore capable of rapidly and reliably detecting any anomaly of a parameter calculated by the anemometric unit 2. It therefore makes it possible to monitor at least one parameter Pt, Ps and/or TAT of the anemometric unit 2 of the airplane, which requires a high level of reliability, from values which are obtained from said data sources Si external to said anemometric unit 2, and whose level of reliability may be lower than that of the parameter which is being monitored owing to the use of at least two separate external data sources Si.

In a particular embodiment, said first data taken into account by the means 13 are, further to the actual (monitored) parameters Ps, Pt and TAT, the following data:

a barometric altitude, calculated in the known way from the value of the static pressure Ps being monitored, this barometric altitude being correctable with the aid of the value of the total temperature TAT being monitored;

a velocity of the aircraft with respect to the air, calculated in the known way with the aid of the values of the pressures Ps and Pt being monitored.

In a particular embodiment, the said means 15 furthermore take into account the following second data, which are obtained from said set 16 of customary data sources Si:

an altitude value provided by a satellite positioning system, in particular the GPS ("Global Positioning System") system;

a total pressure value Pt measured by a probe associated with at least one engine of the aircraft;

a static pressure value Ps measured by a probe associated with at least one engine of the aircraft;

a total temperature value TAT measured by a probe associated with at least one engine of the aircraft;

a velocity value provided by a velocity estimation means;

a static pressure value Ps measured by a multifunctional probe;

a static pressure value Ps measured by a standby instrument; and a total pressure value Pt measured by a standby instrument.

The aforementioned data sources (satellite positioning system, probes associated with the engines, velocity estimation means, multifunctional probe, standby instruments, etc.) are customary sources and form part of said set 16. A standby instrument may, for example, be such as the one described in Application Patent FR-2 784 457.

In a preferred embodiment, said means 18 calculate the following differences in order to monitor the static pressure Ps calculated by the anemometric unit 2:

the difference between a barometric altitude, calculated from said static pressure Ps, and an altitude value provided by a satellite positioning system;

the difference between a barometric altitude, calculated from said static pressure Ps, and an altitude calculated from a static pressure value measured by a standby instrument;

the difference between said static pressure Ps and a static pressure value measured by a probe associated with an engine of the aircraft;

the difference between said static pressure Ps and a static pressure value measured by a multifunctional probe; and the difference between a velocity of the aircraft with respect to the air, calculated from said static pressure Ps, and a velocity value provided by a velocity estimation means.

Furthermore, said means 18 calculate the following differences in order to monitor the total pressure Pt calculated by the anemometric unit 2:

the difference between said total pressure Pt and a total pressure value measured by a probe associated with an engine of the aircraft;

the difference between a velocity of the aircraft with respect to the air, calculated from said total pressure Pt, and a velocity value provided by a velocity estimation means; and the difference between a velocity of the aircraft with respect to the air, calculated from said total pressure Pt, and a velocity calculated from a total pressure value measured by a standby instrument.

Also, said means 18 calculate the following differences in order to monitor the total temperature TAT calculated by the anemometric unit 2:

the difference between a barometric altitude, corrected with the aid of said total temperature TAT, and an altitude value provided by a satellite positioning system;

the difference between said total temperature TAT and a total temperature value measured by a probe associated with an engine of the aircraft; and the difference between a velocity of the aircraft with respect to the air, calculated from said total temperature TAT, and a velocity value provided by a velocity estimation means.

If one or more of the above differences cannot be calculated because at least one of said second data (for example the GPS altitude) is unavailable or is not considered to be valid, the monitoring of said parameters according to the invention may still be carried out for a monitored parameter Ps, Pt, TAT, so long as the differences which are taken into account for monitoring this parameter Ps, Pt, TAT, and which can still be calculated, are calculated from second data obtained from at least two separate external sources Si.

In a particular embodiment applied to an aircraft provided with q engines, q being an integer greater than or equal to 3, the values measured by probes associated with said q engines are taken into account and the corresponding differences are calculated. A difference is then considered to be abnormal only if it is abnormal with respect to the measured values relating to at least three of said q engines.

This makes it possible to avoid prematurely considering a monitored parameter to be invalid (abnormal difference) in the event that a malfunction of one of the engines of the airplane leads to a malfunction of the probe or probes associated with this engine.

In another embodiment applied to an aircraft provided with two engines, the values measured by probes associated with said two engines are taken into account and the corresponding differences are calculated. The differences with respect to the measured values relating to said two engines are considered, and said differences are no longer taken into account in the event of a malfunction by one of said two engines, because there is no longer redundancy of the measurements is no longer available owing to said malfunction.

In a particular embodiment, which is represented in FIG. 2, said a system 10 furthermore includes a manual or automatic disabling means 28, which is connected by a link 29 to the device 1 and which is intended to disable the monitoring of the validity of the monitored parameter or parameters when the aircraft is in at least one particular flight phase such as take-off or landing, and when it is passing through turbulence zones. This allows this monitoring to be made more robust by preventing a monitored parameter from prematurely being considered to be invalid.

The invention claimed is:

1. A method for monitoring the validity of a parameter calculated by an anemometric unit of an aircraft having three engines, the method comprising:
   (a) determining a first datum based on the parameter calculated by the anemometric unit;
   (b) determining three second datums corresponding to the first datum, each of the second datums being determined from a measured value obtained from a separate probe associated with a separate one of the engines;
   (c) calculating, for each of the second datums, a difference between the second datum and the corresponding first datum;
   (d) comparing the absolute value of each of the calculated differences with a predetermined threshold value corresponding to the monitored parameter; and
   (e) determining from the comparisons for the monitored parameter:
      that the parameter is invalid if the absolute values of the three calculated differences are greater than the predetermined threshold value, and
      that the parameter is valid if the absolute values of the three calculated differences are not greater than the predetermined threshold value.

2. A method for monitoring the validity of a parameter calculated by an anemometric unit of an aircraft having two engines, the method comprising:
   (a) determining a first datum based on the parameter calculated by the anemometric unit;
   (b) determining two second datums corresponding to the first datum, each of the second datums being determined from a measured value obtained from a separate probe associated with a separate one of the engines;
   (c) calculating, for each of the second datums, a difference between the second datum and the corresponding first datum;
   (d) comparing the absolute value of each of the calculated differences with a predetermined threshold value corresponding to the monitored parameter;
   (e) determining from the comparisons for the monitored parameter:
      that the parameter is invalid if the absolute values of the two calculated differences are greater than the predetermined threshold value, and
      that the parameter is valid if the absolute values of the two calculated differences are not greater than the predetermined threshold value; and
   (f) disregarding the determination of the validity or invalidity of the parameter in the event of an engine malfunction.

3. A method for monitoring the validity of a parameter generated by an anemometric unit of an aircraft, the method comprising:

(a) determining a first datum based on the parameter generated by the anemometric unit;
(b) determining two second datums corresponding to the first datum, each of the second datums being obtained from a separate source that is external to the anemometric unit;
(c) calculating, for each of the second datums, a difference between the second datum and the corresponding first datum;
(d) comparing the absolute value of each of the calculated differences with a predetermined threshold value corresponding to the monitored parameter; and
(e) determining from the comparisons for the monitored parameter:
that the parameter is invalid if the absolute values of the two calculated differences are greater than the predetermined threshold value, and
that the parameter is valid if the absolute values of the two calculated differences are not greater than the predetermined threshold value.

4. The method of claim 3, wherein the first datum is calculated from the generated parameter.

5. The method of claim 3, wherein the first datum corresponds to the generated parameter.

6. The method of claim 3, wherein at least one of the second datums is calculated from a measured value obtained from an engine probe.

7. The method of claim 3, wherein at least one of the second datums corresponds to a measured value obtained from an engine probe.

8. The method of claim 3, wherein:
operations (a) through (e) are performed for each of two parameters, and
the first datum obtained for one of the parameters depends simultaneously on the two parameters.

9. The method of claim 3, wherein the generated parameter monitored by the anemometric unit is one of a total pressure, a static pressure, and a total temperature.

10. The method of claim 9, wherein:
operations (a) through (e) are performed for either one parameter or each of two parameters, and
the first datum is one of: (i) a barometric altitude calculated from a static pressure that is being monitored, and (ii) a velocity of the aircraft with respect to the air calculated from static and total pressures that are being monitored.

11. The method of claim 3, wherein one of the second datums corresponds to one of:
an altitude value provided by a satellite positioning system,
a total pressure value measured by an engine probe,
a static pressure value measured by an engine probe,
a total temperature value measured by an engine probe,
a velocity value provided by a velocity estimation section,
a static pressure value measured by a multi-functional probe,
a static pressure value measured by a standby instrument, and
a total pressure value measured by a standby instrument.

12. The method of claim 3, wherein the following differences are calculated in operation (c) so as to monitor a static pressure generated by the anemometric unit:
the difference between a barometric altitude, calculated from the static pressure, and an altitude value provided by a satellite positioning system,
the difference between a barometric altitude, calculated from the static pressure, and an altitude calculated from a static pressure value measured by a standby instrument,
the difference between the static pressure and a static pressure value measured by an engine probe,
the difference between the static pressure and a static pressure value measured by a multi-functional probe, and
the difference between a velocity of the aircraft with respect to the air, calculated from the static pressure, and a velocity value provided by a velocity estimation section.

13. The method of claim 3, wherein the following differences are calculated in operation (c) so as to monitor a total pressure generated by the anemometric unit:
the difference between the total pressure and a total pressure value measured by an engine probe,
the difference between a velocity of the aircraft with respect to the air, calculated from the total pressure, and a velocity value provided by a velocity estimation section, and
the difference between a velocity of the aircraft with respect to the air, calculated from the total pressure, and a velocity calculated from a total pressure value measured by a standby instrument.

14. The method of claim 3, wherein the following differences are calculated in operation (c) so as to monitor a total temperature generated by the anemometric unit:
the difference between a barometric altitude, corrected with the aid of the total temperature, and an altitude value provided by a satellite positioning system;
the difference between the total temperature and a total temperature value measured by an engine probe, and
the difference between a velocity of the aircraft with respect to the air, calculated from the total temperature, and a velocity value provided by a velocity estimation section.

15. The method of claim 3, wherein the monitoring of the validity of the parameter is disabled when the aircraft is in a particular flight phase.

16. An apparatus that monitors the validity of a parameter, the apparatus comprising:
an aircraft anemometric unit that generates the parameter;
a first determining section that determines a first datum based on the parameter generated by the anemometric unit;
a second determining section that determines two second datums corresponding to the first datum, each of the second datums being obtained from a separate source that is external to the anemometric unit;
a calculator that calculates, for each of the second datums, a difference between the second datum and the corresponding first datum;
a comparator that compares the absolute value of each of the calculated differences with a predetermined threshold value corresponding to the monitored parameter; and
a determining section that determines from the comparisons for the monitored parameter:
that the parameter is invalid if the absolute values of the two calculated differences are greater than the predetermined threshold value, and
that the parameter is valid if the absolute values of the two calculated differences are not greater than the predetermined threshold value.

* * * * *